(12) United States Patent
Xu

(10) Patent No.: US 6,383,965 B1
(45) Date of Patent: May 7, 2002

(54) METHOD OF REGENERATING A MOLECULAR SIEVE CATALYST

(76) Inventor: Hengbo Xu, c/o Shengli Oil Field, Petroleum Chemical Complex, Sulphur Recovery Unit, Dongying City, Shandong 257000 (CN)

( * ) Notice: Subject to any disclaimer, the term of this patent is extended or adjusted under 35 U.S.C. 154(b) by 0 days.

(21) Appl. No.: 09/508,158
(22) PCT Filed: Sep. 8, 1998
(86) PCT No.: PCT/CN98/00184
 § 371 Date: May 12, 2000
 § 102(e) Date: May 12, 2000
(87) PCT Pub. No.: WO99/12643
 PCT Pub. Date: Mar. 18, 1999

(30) Foreign Application Priority Data

Sep. 8, 1997 (CN) ......................................... 97106088 A

(51) Int. Cl.⁷ ............................. B01J 20/34; B01J 38/12
(52) U.S. Cl. ............................. 502/38; 502/56; 502/49
(58) Field of Search ............................. 502/56, 38, 49

(56) References Cited

U.S. PATENT DOCUMENTS 3,412,013 A    11/1968    Bowles
4,010,094 A  * 3/1977    McKinney ............... 208/164
4,198,287 A  * 4/1980    Hemler, Jr. et al. ...... 208/113
4,284,583 A  * 8/1981    Pujado ..................... 260/465

FOREIGN PATENT DOCUMENTS

EP    0790075    8/1997
WO    9637299    11/1996

* cited by examiner

Primary Examiner—Steven P. Griffin
Assistant Examiner—Edward M. Johnson
(74) Attorney, Agent, or Firm—Ladas & Parry

(57) ABSTRACT

A process for regenerating spent molecular sieve catalysts from a fluidized catalytic cracking unit in an oil refinery with high temperature flue gas from a second group of cyclones with the spent catalyst in a first riser regenerator to form a mixture of a half-regenerated catalyst and flue gas, separating the half-regenerated catalyst from the mixture formed in the previous step in a first group of cyclones, mixing the half-regenerated catalyst from the first group of cyclones with a sufficient amount of air for burning off coke on the spent catalyst in a second riser regenerator to form a mixture of high-temperature flue gas and a regenerator catalyst, separating the regenerated catalyst formed from the preceding step from the mixture in the second group of cyclones and recovering the surplus heat from the regenerated catalyst from the second group of cyclones by a regenerated catalyst cooler.

1 Claim, 1 Drawing Sheet

METHOD OF REGENERATING A MOLECULAR SIEVE CATALYST

FIELD OF THE INVENTION

The present invention relates to a process for regenerating a spent molecular sieve catalysts of the Fluidized Catalytic Cracking Unit (FCCU) in oil refinery. More particularly, the present invention relates to a process for regenerating a spent molecular sieve catalysts using two riser regenerators.

DESCRIPTION OF THE PRIOR ART

Up till now, the molecular sieve catalyst, which has been used in FCCU, is regenerated in a fluidized bed and a combustion riser. The combustion riser is not used alone, and must be used in combination with a fluidized bed. But, the fluidized bed regeneration has the following problems: long catalyst residence time, serious catalyst back-mixing, low Carbon Burning Intensity (CBI), complicated inside structures, difficult to uniformly fluidize and keep a good distribution of particles, easy damage of the inside equipment, etc.

In recent years, the riser regenerator has received substantial interest. But, coke combustion in the riser regenerator requires circulation of a high temperature catalyst and air injection at various heights of the riser regenerator, and back-mixed problem has not been solved. It is not able that main operation parameters such as space-velocity and temperature are both high at the same time.

BRIEF SUMMARY OF THE INVENTION

Accordingly, it is an object of the present invention to provide a process of regenerating spent molecular sieve catalysts comprising the steps of:

(1) mixing a high temperature flue gas that comes from a second group of cyclones with the spent catalyst in a first riser regenerator to form a mixture of a half-regenerated catalyst and a flue gas at the top of the first riser regenerator;

(2) separating the half-regenerated catalyst from the mixture in a first group of cyclones;

(3) mixing the half-regenerated catalyst that comes from the first group of cyclones with a sufficient amount of air for burning off all coke on the spent catalyst in a second riser regenerator to form a mixture of a high temperature flue gas and a regenerated catalyst at the top of the second riser regenerator;

(4) separating the regenerated catalyst from the mixture in the second group of cyclones; and (5) recovering surplus heat from the regenerated catalyst that comes from the second group of cyclones by a regenerated catalyst cooler which is located outside of the second riser regenerator.

DESCRIPTION OF THE DRAWINGS

The FIGURE is a schematic representation of a process flow diagram of the present invention.

DETAILED DESCRIPTION OF THE INVENTION

Figure 1:
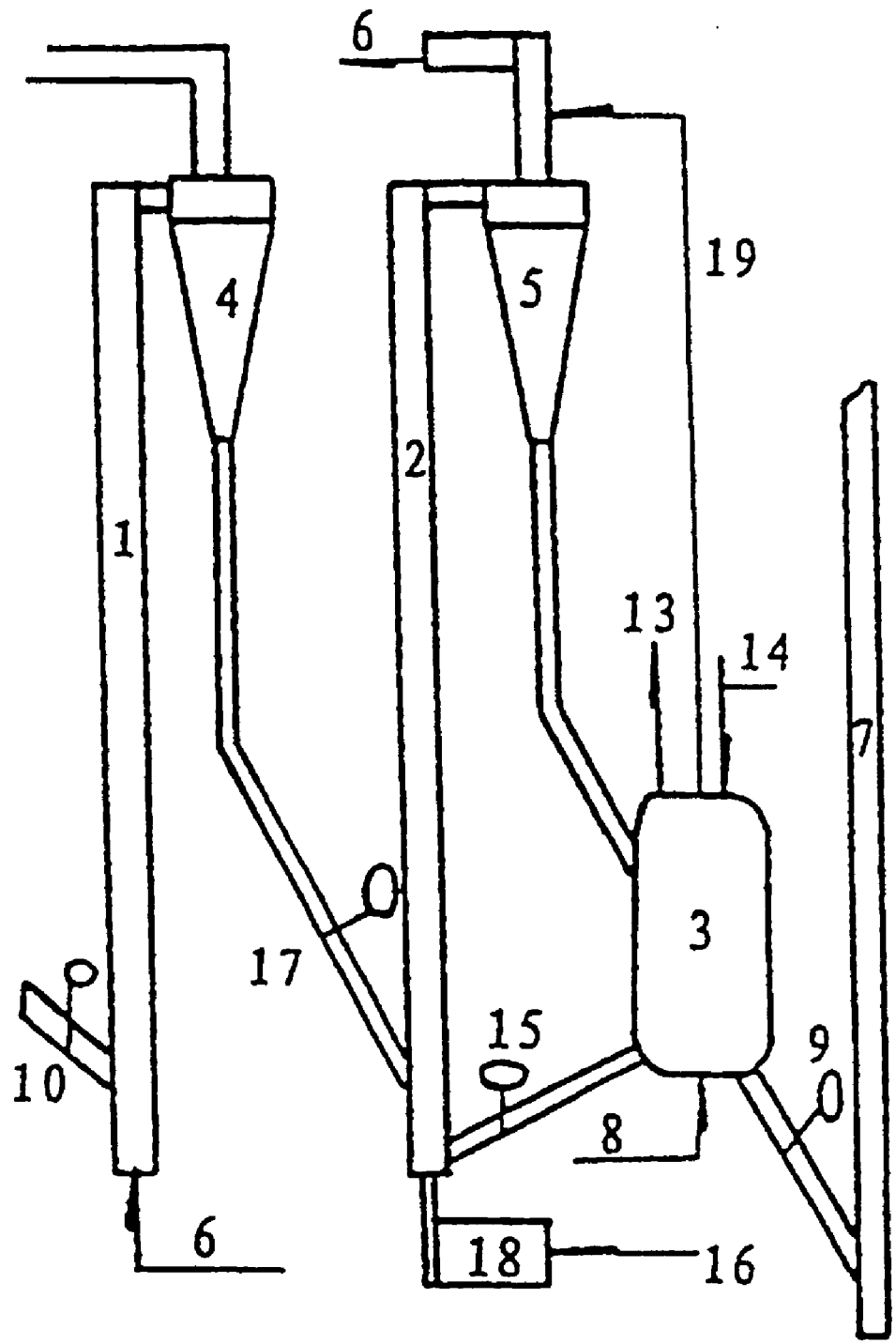

The first group of cyclones and the second group of cyclones are located outside of the first riser regenerator and the second riser regenerator, respectively.

The half-regenerated catalyst is formed by burning off the most of hydrogen and about 50~80 wt % carbon on the spent catalyst.

In a preferred embodiment, a slide valve is installed at the entrance of the last cyclone of the first group of cyclones for adjusting separation efficiency.

The regenerated catalyst is formed by mixing the high temperature half-regenerated catalyst with a sufficient amount of air for burning off all coke on the spent catalyst to burn off the remainder coke on the half-regenerated catalyst in the second riser regenerator.

In a preferred embodiment, the mixture in the first and second riser regenerator flows in plug flow form.

By comparing with the prior art, the process according to this invention possesses the following effects:

(1) The coke on the spent catalyst can be fully burnt off. The regenerated catalyst can be restored to the highest activity.

(2) All catalyst inventories in the regenerators can be reduced to a very low level. The CBI is about 10 times of the fluidized bed.

(3) The carbon burning time is very short and usually about 10 second per a circulation. The summation of carbon burning time is about 1.21 hours every day. The activity of the regenerated catalyst is remained well.

(4) The poisoning of the catalyst caused by the heavy metal such as nickel can be restrain by the high temperature and more than 10 volume percent oxygen flue gas in the second riser regenerator and the fluidization air in the regenerated catalyst cooler.

(5) The investment is the most economical, the production cost is very low, the operation range is wide and the maintenance of the equipment is easy.

(6) The plug flow may extenuate the back-mixing degree of the catalyst.

(7) The CO oxidation promoter is eliminated because this process has not the harm of after-burning.

(8) The slide valve can be fit up on the entrance of the last cyclone of the first group of cyclones to reduce the loss of the catalyst.

Now referring to the FIGURE, a spent molecular sieve catalyst flows down the spent catalyst pipe 10 to the first riser regenerator 1. The spent catalyst at the bottom of the first riser regenerator mixes with a high temperature flue gas 6 which comes from the second group of cyclones 5 to bum off most hydrogen and about 50~80 wt % carbon and to form a mixture of a half-regenerated catalyst and a flue gas. The mixture is introduced into the first group of cyclones 4 located outside of the first riser regenerator 1. The half-regenerated catalyst is separated from the mixture in the first group of cyclones 4. The half-regenerated catalyst may flow down a pipe to a buffer tank (not shown), then to the second riser regenerator 2 or directly flow down a pipe 17 to the second riser regenerator 2. A sufficient amount of air 16 for burning off all coke on the spent catalyst is introduced into the bottom of the second riser regenerator 2 through air heater 18. The half-regenerated catalyst mixes with air 16 in the second riser regenerator 2 to burn off the remainder coke on the half-regenerated catalyst and to form a mixture of a high temperature flue gas and a regenerated catalyst. The mixture is introduced into the second group of cyclones 5 located outside of the second riser regenerator 2. The regenerated catalyst is separated from the mixture in the second group of cyclones 5. Then, the regenerated catalyst flows down a pipe to cooler 3 to recover surplus heat from it. Finally, the regenerated catalyst flows down the regenerated catalyst pipe to a riser reactor 7. The high temperature flue gas 6 which is from the second group of cyclones 5 contains more than 10 volume percent oxygen and some fine catalyst particles and is introduced into the bottom of the first riser regenerator 1 to carry, heat and ignite the coke on the spent catalyst.

In the FIGURE, reference numeral 8 refers to fluidization air, reference numeral 11 refers to flue gas, reference numeral 13 refers to water steam, reference numeral 14 refers to deoxidizing water, reference numeral 15 refers to a circulation pipe of the catalyst for start-up, and reference numeral 19 refers to a air pipe.

EXAMPLE

Suppose a regeneration system of FCCU has a capacity of 200000 tons per year of fresh feed, and coke yield is 8 wt %, the calculation results are as follows:

|  | First riser regenerator | Second riser Regenerator |
|---|---|---|
| Top temperature/° C. | 690 | 730 |
| Pressure/MPa | 0.195 | 0.200 |
| Diameter/m | 1.12 | 0.987 |
| Length/m | 30.0 | 40.0 |
| Space velocity/m/s | 6.0 | 8.0 |
| Carbon burning time/sec. | 5.0 | 5.0 |
| Catalyst inventory/ton | 0.547 | 0.547 |
| CBI/kg/(h.t) | 1827.0 | 1827.0 |

The CBI of the fluidized bed regenerator is the range of from 100 to 250 kg/(h.t). The CBI of the fluidized bed with the combustion riser is the range of from 400 to 600 kg/(h.t).

The average CBI of the riser regenerator of this invention is about 1827 kg/(h.t).

This invention makes three important breakthroughs in center task of the regeneration process of the catalyst.

1. The coke on regenerated catalyst can be burned to zero.
2. Its CBI is about 10 times that of the fluidized bed.
3. The environment of bum coke is good enough for retaining high activity and selectivity of the catalyst that is important for raising the product rate of light oil and reducing the production cost of the FCCU.

What is claimed is:

1. A process for regenerating a spent molecular sieve catalyst comprising the steps of:

(1) mixing a high temperature flue gas that comes from a second group of cyclones with the spent catalyst in a first riser regenerator to form a mixture of a half-rengenerated catalyst and a flue gas at the top of the first riser regenerator;

(2) separating the half-regenerated catalyst from the mixture formed in step 1 in a first group of cyclones;

(3) mixing the half-regenerated catalyst that comes from the first group of cyclones with a sufficient amount of air for burning off all coke on the spent catalyst in a second riser rengerator to form a mixture of a high temperature flue gas and a regenerated catalyst at the top of the second riser regenerator;

(4) separating the regenerated catalyst from the mixture formed in step 3in the second group of cyclones; and (5) recovering surplus heat from the renegerated catalyst that comes from the second group of cyclones by a regenerated catalyst cooler which is located outside of the second riser regenerator.

* * * * *